(12) United States Patent
Saint-Gerard et al.

(10) Patent No.: US 9,493,647 B2
(45) Date of Patent: Nov. 15, 2016

(54) THERMOPLASTIC COMPOSITION, METHOD OF PRODUCING THE SAME, AND ARTICLES MADE THEREFROM

(75) Inventors: Yannick Saint-Gerard, Roquefort-les-Pins (FR); Veera Nelliappan, North Wales, PA (US); Yannick Chiquet, Valbonne (FR); Eric G. Lundquist, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 364 days.

(21) Appl. No.: 13/876,001

(22) PCT Filed: Oct. 26, 2011

(86) PCT No.: PCT/US2011/057793
§ 371 (c)(1),
(2), (4) Date: May 24, 2013

(87) PCT Pub. No.: WO2012/058256
PCT Pub. Date: May 3, 2012

(65) Prior Publication Data
US 2013/0237673 A1    Sep. 12, 2013

Related U.S. Application Data

(60) Provisional application No. 61/408,258, filed on Oct. 29, 2010.

(51) Int. Cl.
*C08L 67/02*    (2006.01)
*C08L 67/07*    (2006.01)
(Continued)

(52) U.S. Cl.
CPC ............ *C08L 67/07* (2013.01); *B29C 45/0001* (2013.01); *C08L 67/02* (2013.01); *C08L 69/00* (2013.01); *C08L 33/12* (2013.01); *C08L 2205/22* (2013.01)

(58) Field of Classification Search
CPC ............................ C08L 67/02; B29C 45/0001
See application file for complete search history.

(56) References Cited

U.S. PATENT DOCUMENTS 4,657,805 A * 4/1987 Fukumitsu et al. .......... 428/215
5,008,340 A * 4/1991 Guerra et al. ................ 525/193
(Continued)

FOREIGN PATENT DOCUMENTS

JP        2006131833      5/2006
WO    WO 2009/078602      6/2009
(Continued)

OTHER PUBLICATIONS

The Polymer Handbook (2005).*
Chinese Office Action dated Nov. 17, 2014; from Chinese counterpart Application No. 201180063548.5.
Japanese Office Action dated Apr. 14, 2015 for counterpart Japanese Application No. 2013-536765, 1 page.
(Continued)

*Primary Examiner* — Mark Kaucher

(57) ABSTRACT

The instant invention provides a thermoplastic composition, method of producing the same, and articles made therefrom. The thermoplastic composition according to present invention comprises the melt blending product of: (A) from 55 to 95 percent by weight of a thermoplastic matrix comprising one or more thermoplastic polymers; and (B) from 5 to 45 percent by weight of a dispersed phase which comprises a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is greater than 0.08.

9 Claims, 2 Drawing Sheets

(51) Int. Cl.
*C08L 69/00* (2006.01)
*B29C 45/00* (2006.01)
*C08L 33/12* (2006.01)

(56) References Cited

U.S. PATENT DOCUMENTS

| | | | |
|---|---|---|---|
| 5,455,315 A * | 10/1995 | Paine et al. | 526/79 |
| 6,198,216 B1 * | 3/2001 | Kosa et al. | 313/503 |
| 6,399,701 B1 * | 6/2002 | Enright et al. | 524/832 |
| 2001/0051268 A1 * | 12/2001 | Iriguchi et al. | 428/402 |
| 2003/0220446 A1 * | 11/2003 | Faler et al. | 524/590 |
| 2008/0132646 A1 | 6/2008 | Trindade et al. | |
| 2010/0284170 A1 * | 11/2010 | Awaji et al. | 362/97.1 |
| 2013/0317174 A1 * | 11/2013 | Nelliappan et al. | 525/132 |

FOREIGN PATENT DOCUMENTS

| | | |
|---|---|---|
| WO | WO 2009072409 A1 * | 6/2009 |
| WO | WO 2009/128601 | 10/2009 |
| WO | WO2010/089060 | 8/2010 |

OTHER PUBLICATIONS

Response to Japanese Office Action dated Apr. 14, 2015 filed Jul. 10, 2015 for counterpart Japanese Application No. 2013-536765, 4 pages.

Chinese Office Action Apr. 28, 2015; from Chinese counterpart Application No. 201280012290.0.

Japanese Office Action dated Nov. 26, 2015; from Japanese counterpart Application No. 2013-536765.

Chinese Response to Office Action dated Dec. 3, 2015; from Chinese counterpart Application No. 201180063548.5.

Chinese Third Office Action dated Oct. 22, 2015; from Chinese counterpart Application No. 201180063548.5.

Response to First Chinese Office Action for counterpart Chinese Application No. 201180063548.5, 6 pages, Date: 2014.

Search Report from counterpart PCT Application No. PCT/11/57793, Date:2012.

IPRP from counterpart PCT Application No. PCT/11/57793, Date: 2013.

* cited by examiner

THERMOPLASTIC COMPOSITION, METHOD OF PRODUCING THE SAME, AND ARTICLES MADE THEREFROM

This application is a National Stage Entry of PCT/US2011/057793; filed on Oct. 26, 2011; which claims priority to U.S. Provisional Application No. 61/408,258, filed on Oct. 29, 2010, which is incorporated by reference in its entirety.

FIELD OF INVENTION

The instant invention relates to a thermoplastic composition, method of producing the same, and articles made therefrom, wherein the articles have a nacreous surface appearance.

BACKGROUND OF THE INVENTION

Nacreous pigments currently used in coatings and plastics are predominantly coated micas. Nacreous pigments are made by forming a uniform coating of $TiO_2$ on mica platelets; the mica serves as a transparent template so that the high refractive index $TiO_2$ can assume the required platelet shape. Thicker platelets are produced to make interference colors. Light interference is created by interaction of the reflections from the upper and lower surfaces of the platelet, as well as interference between the reflected light and the light that passes through the platelets. A reflection maximum occurs at the wavelength of light for which the reflections from the upper and lower surfaces of the platelet are in phase. A reflection minimum occurs at the wavelength for such two reflections are exactly out of phase and cancel each other.

When nacreous pigments are incorporated into plastics and processed, they are subject to relatively high shear forces, for example, during extrusion. Under high shear conditions a portion of known nacreous pigments are stripped from the mica platelets, and the nacreous effect is muted.

Therefore, a need exists for a thermoplastic composition providing a nacreous effect on articles prepared from the thermoplastic composition and for which the nacreous effect is not negatively impacted upon exposure to high shear conditions.

SUMMARY OF THE INVENTION

The instant invention provides a thermoplastic composition, method of producing the same, and articles made therefrom, wherein the articles have a nacreous surface appearance.

In one embodiment, the instant invention to a thermoplastic composition comprising the melt blending product of: (A) from 55 to 95 percent by weight of a thermoplastic matrix comprising one or more thermoplastic polymers; and (B) from 5 to 45 percent by weight of a dispersed phase comprising a crosslinked (meth)acrylate copolymer, wherein the (meth)acrylate copolymer comprises at least 95 percent by weight derived from units of methyl methacrylate and from greater than zero to less than 0.5 percent by weight derived from one or more multifunctional cross-linking monomers and/or graft-linking agents; wherein the difference in refractive index between components (A) and (B) is equal to or greater than 0.08.

In an alternative embodiment, the instant invention further provides a method for producing a thermoplastic composition comprising: selecting a thermoplastic matrix comprising one or more thermoplastic polymers; selecting a dispersed phase comprising a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; melt kneading component (B) into thermoplastic matrix; thereby producing the thermoplastic composition, wherein the thermoplastic composition comprises from 55 to 95 percent by weight of the thermoplastic matrix, and from 5 to 45 percent by weight of component (B), based on the total weight of the thermoplastic composition.

In another alternative embodiment, the instant invention further provides an article comprising: a thermoplastic composition comprising the melt blending product of: (A) from 55 to 95 percent by weight of a thermoplastic matrix; and (B) from 5 to 45 percent by weight of a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08 and wherein the thermoplastic composition has a Flop Index value equal to or greater than 4.

In another alternative embodiment, the instant invention further provides a method for forming an article comprising: selecting a thermoplastic composition comprising the melt blending product of: (A) from 55 to 95 percent by weight of a thermoplastic matrix comprising one or more thermoplastic polymers; and (B) from 5 to 45 percent by weight of a crosslinked (meth)acrylate copolymer, under high shear conditions, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; forming said thermoplastic composition into said article.

In another alternative embodiment, the instant invention further provides a thermoplastic composition wherein the crosslinked (meth)acrylate copolymer has an initial volume average particle size of less than 1.0 micron.

In another alternative embodiment, the instant invention further provides a thermoplastic composition wherein the crosslinked (meth)acrylate copolymer has a weight average molecular weight of less than 1 million g/mole.

In another alternative embodiment, the instant invention further provides a thermoplastic composition wherein the crosslinked (meth)acrylate copolymer has a glass transition temperature (Tg) equal to or greater than 100° C. (measured by DSC, second heat).

In another alternative embodiment, the instant invention further provides a thermoplastic composition wherein the thermoplastic composition has a Flop Index value equal to or greater than 4.

In another alternative embodiment, the instant invention further provides a thermoplastic composition wherein the crosslinked (meth)acrylate copolymer is obtained by an emulsion polymerization process.

In another alternative embodiment, the instant invention further provides a thermoplastic composition wherein component (B), the dispersed phase, further comprises 0.01 to 10 weight percent derived from one or more chain-transfer agents units.

In some embodiments, the one or more chain transfer agents are selected from $C_4$-$C_{18}$ alkyl mercaptans, mercapto-group-containing acids/esters, thiophenols, carbon tetrabromide, carbon tetrachloride, and trichlorobromoethane and combinations thereof.

In another alternative embodiment, the instant invention further provides a thermoplastic composition wherein the thermoplastic matrix comprises one or more polyesters.

In another alternative embodiment, the instant invention further provides a thermoplastic composition wherein the thermoplastic matrix comprises one or more polycarbonates.

In another alternative embodiment, the instant invention further provides a thermoplastic composition wherein the cross-linking monomer is selected from the group consisting of; aromatic cross-linking and/or graftlinking monomers including divinylbenzene; vinyl group-containing monomers including; allyl compounds including allyl(meth)acrylate, diallyl fumarate, diallyl phthalate, diallylacrylamide, triallyl(iso)cyanurate, and triallyl trimelitate; ethylene glycol dimethacrylate, diethylene glycol dimethacrylate, (poly)alkylene glycol di(meth)acrylate compounds including 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, and glycerol tri(meth)acrylate and graftlinking monomers, which are polyethylenically unsaturated monomers copolymerizable with the monounsaturated monomers present, and having two or more non-conjugated double bonds of differing reactivity, such as allyl methacrylate, diallyl maleate and allyl acryloxypropionate and combinations of the crosslinking and/or graftlinking monomers.

In another alternative embodiment, the instant invention further provides a thermoplastic composition wherein the thermoplastic polymer composition further comprises an additive comprising a flame retardant, antimicrobial agent, lubricant, heat stabilizer, antioxidant, light-stabilizer, compatibilizer, dye, inorganic additive, surfactant, nucleating agent, coupling agent, filler, plasticizer, impact modifier, colorant, stabilizer, slip agent, anti-static compound, pigment and/or a combination of two or more thereof.

In another alternative embodiment, the instant invention further provides a method of forming an article from the thermoplastic composition wherein the step of forming the thermoplastic composition into an article comprises injection molding the thermoplastic composition into an article at a temperature is equal to or greater than 170° C. and at a shear rate is equal to or greater than $100\ s^{-1}$.

In another alternative embodiment, the instant invention provides a thermoplastic composition comprising the melt blending product of: (A) from 55 to 95 percent by weight of a thermoplastic matrix comprising one or more thermoplastic polymers; and (B) from 5 to 45 percent by weight of a dispersed phase comprising a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08 and wherein the thermoplastic composition has a Flop Index value of equal to or greater than 4.

In yet another embodiment, the instant invention provides a thermoplastic composition consisting essentially of the melt blending product of: (A) from 55 to 95 percent by weight of a thermoplastic matrix comprising one or more thermoplastic polymers; and (B) from 5 to 45 percent by weight of a dispersed phase a crosslinked (meth)acrylate copolymer, wherein the (meth)acrylate copolymer comprises at least 95 percent by weight methyl methacrylate units and from greater than zero to less than 0.5 percent by weight of one or more multifunctional cross-linking monomers and/or graft-linking agents; wherein the difference in refractive index between components (A) and (B) is equal to or greater than 0.08.

In yet another embodiment, the instant invention provides a thermoplastic composition comprising the melt blending product of: (A) from 55 to 95 percent by weight of a thermoplastic matrix consisting essentially of one or more thermoplastic polymers; and (B) from 5 to 45 percent by weight of a dispersed phase comprising a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08.

In yet another embodiment, the instant invention provides a thermoplastic composition comprising the melt blending product of: (A) from 55 to 95 percent by weight of a thermoplastic matrix comprising one or more thermoplastic polymers; and (B) from 5 to 45 percent by weight of a dispersed phase which consisting essentially of a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08.

In yet another embodiment, the instant invention further provides a method for producing a thermoplastic composition consisting essentially of the steps of: selecting a thermoplastic matrix comprising one or more thermoplastic polymers; selecting a dispersed phase comprising a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; melt kneading component (B) into thermoplastic matrix; thereby producing the thermoplastic composition, wherein the thermoplastic composition comprises from 55 to 95 percent by weight of the thermoplastic matrix, and from 5 to 45 percent by weight of component (B), based on the total weight of the thermoplastic composition.

In yet another embodiment, the instant invention further provides a method for producing a thermoplastic composition comprising: selecting a thermoplastic matrix consisting essentially of one or more thermoplastic polymers; selecting a dispersed phase comprising a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; melt kneading component (B) into thermoplastic matrix; thereby producing the thermoplastic composition, wherein the thermoplastic composition comprises from 55 to 95 percent by weight of the thermoplastic matrix, and from 5 to 45 percent by weight of component (B), based on the total weight of the thermoplastic composition.

In yet another embodiment, the instant invention further provides a method for producing a thermoplastic composition comprising: selecting a thermoplastic matrix comprising one or more thermoplastic polymers; selecting a dispersed phase comprising a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; melt kneading component (B) into thermoplastic matrix; thereby producing the thermoplastic composition, wherein the thermoplastic composition consists essentially of from 55 to 95 percent by weight of the thermoplastic matrix, and from 5 to 45 percent by weight of component (B), based on the total weight of the thermoplastic composition.

In another alternative embodiment, the instant invention further provides an article consisting essentially of: a thermoplastic composition comprising the melt blending product of: (A) from 55 to 95 percent by weight of a thermoplastic matrix; and (B) from 5 to 45 percent by weight of a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08 and wherein the thermoplastic composition has a Flop Index value equal to or greater than 4.

In another alternative embodiment, the instant invention further provides an article comprising: a thermoplastic composition consisting essentially of the melt blending product of: (A) from 55 to 95 percent by weight of a thermoplastic matrix; and (B) from 5 to 45 percent by weight of a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08 and wherein the thermoplastic composition has a Flop Index value equal to or greater than 4.

In another alternative embodiment, the instant invention further provides an article comprising: a thermoplastic composition comprising the melt blending product of: (A) from 55 to 95 percent by weight of a thermoplastic matrix; and (B) from 5 to 45 percent by weight of a crosslinked (meth)acrylate copolymer, wherein the (meth)acrylate copolymer consists essentially of at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08 and wherein the thermoplastic composition has a Flop Index value equal to or greater than 4.

In another alternative embodiment, the instant invention further provides a method for forming an article consisting essentially of: selecting a thermoplastic composition comprising the melt blending product of: (A) from 55 to 95 percent by weight of a thermoplastic matrix comprising one or more thermoplastic polymers; and (B) from 5 to 45 percent by weight of a crosslinked (meth)acrylate copolymer, under high shear conditions, wherein the (meth)acrylate copolymer comprises at least 95 percent by weight methyl methacrylate units and from greater than zero to less than 0.5 percent by weight of one or more multifunctional cross-linking monomers and/or graft-linking agents; forming said thermoplastic composition into said article.

In another alternative embodiment, the instant invention further provides a method for forming an article comprising: selecting a thermoplastic composition comprising the melt blending product of: (A) from 55 to 95 percent by weight of a thermoplastic matrix consisting essentially of one or more thermoplastic polymers; and (B) from 5 to 45 percent by weight of a crosslinked (meth)acrylate copolymer, under high shear conditions, wherein the (meth)acrylate copolymer comprises at least 95 percent by weight methyl methacrylate units and from greater than zero to less than 0.5 percent by weight of one or more multifunctional cross-linking monomers and/or graft-linking agents; forming said thermoplastic composition into said article.

In another alternative embodiment, the instant invention further provides a method for forming an article comprising: selecting a thermoplastic composition comprising the melt blending product of: (A) from 55 to 95 percent by weight of a thermoplastic matrix comprising one or more thermoplastic polymers; and (B) from 5 to 45 percent by weight of a crosslinked (meth)acrylate copolymer, under high shear conditions, wherein the (meth)acrylate copolymer consists essentially of at least 95 percent by weight derived from methyl methacrylate units and from greater than zero to less than 0.5 percent by weight derived from one or more multifunctional cross-linking monomers and/or graft-linking agents; forming said thermoplastic composition into said article.

In another alternative embodiment, the instant invention provides a thermoplastic composition consisting essentially of the melt blending product of: (A) from 55 to 95 percent by weight of a thermoplastic matrix comprising one or more thermoplastic polymers; and (B) from 5 to 45 percent by weight of a dispersed phase which comprises a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08 and wherein the thermoplastic composition has a Flop Index value of equal to or greater than 4.

In another alternative embodiment, the instant invention provides a thermoplastic composition comprising the melt blending product of: (A) from 55 to 95 percent by weight of a thermoplastic matrix consisting essentially of one or more thermoplastic polymers; and (B) from 5 to 45 percent by weight of a dispersed phase which comprises a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08 and wherein the thermoplastic composition has a Flop Index value of equal to or greater than 4.

In another alternative embodiment, the instant invention provides a thermoplastic composition comprising the melt blending product of: (A) from 55 to 95 percent by weight of a thermoplastic matrix comprising one or more thermoplastic polymers; and (B) from 5 to 45 percent by weight of a dispersed phase which comprises a crosslinked (meth)acrylate copolymer, wherein the (meth)acrylate copolymer consists essentially of at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08 and wherein the thermoplastic composition has a Flop Index value of equal to or greater than 4.

In yet another embodiment of the invention, the crosslinked (meth)acrylate copolymer of the inventive thermoplastic composition has a swell ratio from 1.5 to 15; alternatively, from 4 to 12; alternatively from 3 to 10; alternatively, from 5 to 9; alternatively from 6 to 10; alternatively, from 7 to 15; or alternatively, from 7 to 13.

BRIEF DESCRIPTION OF THE DRAWINGS

For the purpose of illustrating the invention, there is shown in the drawings a form that is exemplary; it being understood, however, that this invention is not limited to the precise compositions and instrumentalities exemplified and shown.

DETAILED DESCRIPTION OF EMBODIMENTS OF THE INVENTION

Figure 1A:
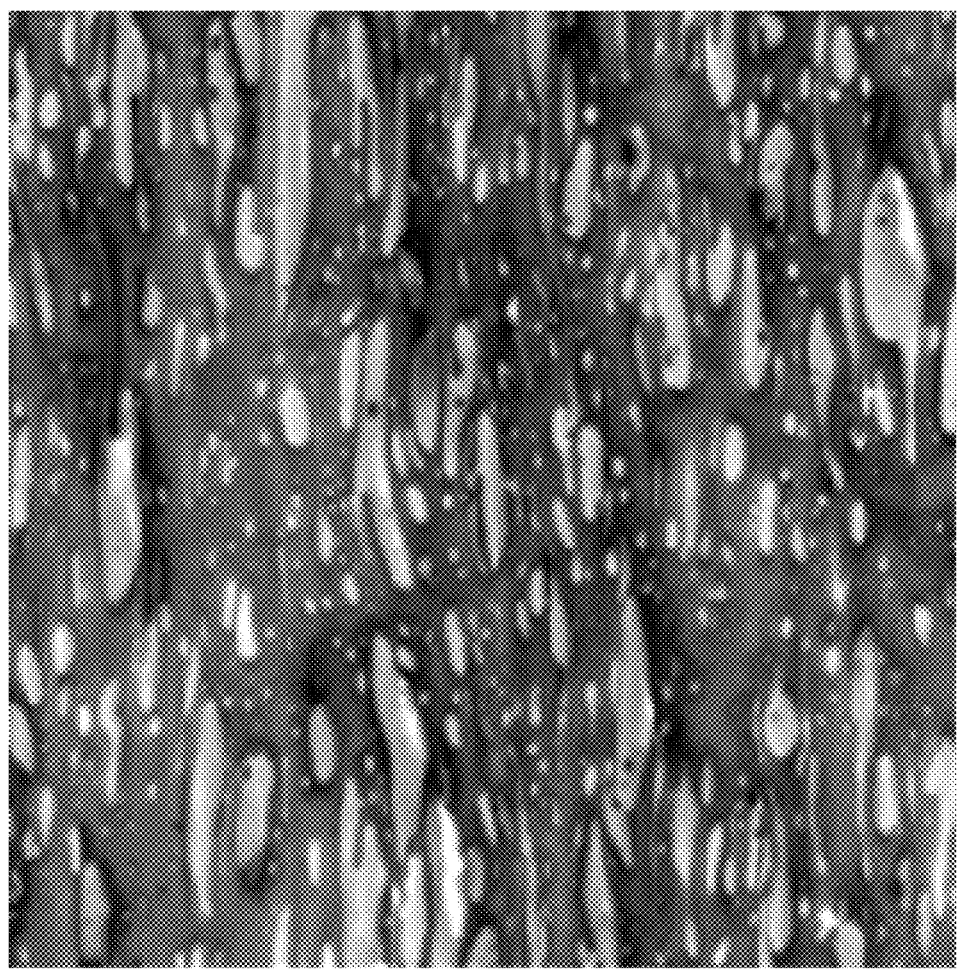
FIGS. 1A and 1B are transmission electron micrographs of Inventive Example 1 and Comparative Example 1, respectively, at acc. voltage of 100 kV, following formation into 3 mm plaques formed by injection molding with the sample prepared with an RT microtome and $RuO_4$ stain.

The following abbreviations are used herein:
"BMP" means butyl mercapto propionate;
"PET" means polyethylene terephthalate;
"PBT" means polybutylene terephthalate;
"EGDMA" means ethylene glycol dimethacrylate;
"NaEDTA" means sodium salt of ethylene diamine tetraacetate;
"MMA" means methyl methacrylate; and
"(meth)acrylate" means acrylate or methacrylate.

The instant invention provides a thermoplastic composition, method of producing the same, and articles made therefrom, wherein the articles have a nacreous surface appearance.

The thermoplastic composition according to the present invention comprises: (A) from 55 to 95 percent by weight of a thermoplastic matrix comprising one of more thermoplastic polymers; and (B) from 5 to 45 percent by weight of a dispersed phase which comprises a crosslinked (meth)acrylate copolymer, wherein the (meth)acrylate copolymer comprises at least 95 percent by weight derived from methyl methacrylate units and from greater than zero to less than 0.5 percent by weight derived from one or more multifunctional cross-linking monomers and/or graft-linking agents; wherein the difference in refractive index between components (A) and (B) is equal to or greater than 0.08.

The thermoplastic composition according to the present invention comprises from 55 to 95 percent by weight of a component (A) comprising a thermoplastic matrix which comprises one or more thermoplastic polymers, based on the total weight of the thermoplastic composition. All individual values and subranges from 55 to 95 percent are included herein and disclosed herein; for example, the weight percent of the thermoplastic matrix may be from a lower limit of 55, 60, 65, 70, 75, 80, or 85 weight percent to an upper limit of 75, 80, 85, 90 or 95 weight percent, based on the total weight of the thermoplastic composition. For example, the weight percent of the thermoplastic matrix may be in the range of from 55 to 95 weight percent, or in the alternative, from 70 to 90 weight percent, or in the alternative, from 65 to 90 weight percent, based on the total weight of the thermoplastic composition. The thermoplastic matrix comprises one or more thermoplastic polymers. Exemplary thermoplastic polymers include, but are not limited to thermoplastic polyesters (PET, PBT), polyphenylene sulfide, polyamides, polystyrene, (plasticized) polyvinyl chloride, polycarbonate, polylactic acid, fluorinated ethylene-propylene copolymer, polysulfone, blends thereof and combinations thereof.

The thermoplastic composition of the invention further comprises from 5 to 45 percent by weight, based on the total weight of the thermoplastic composition, of a dispersed phase, component (B), which comprises one or more crosslinked (meth)acrylate copolymer, wherein the (meth)acrylate copolymer comprises at least 95 percent by weight derived from methyl methacrylate units. All individual values and subranges from 5 to 45 percent are included herein and disclosed herein; for example, the weight percent of the thermoplastic matrix be from a lower limit of 5, 10, 12, 15, 20, or 25 weight percent to an upper limit of 15, 20, 25, 30, 35, 40 or 45 weight percent, based on the total weight of the thermoplastic composition. For example, the weight percent of the thermoplastic matrix may be in the range of from 5 to 45 weight percent, or in the alternative from 5 to 35 weight percent, or in the alternative, from 10 to 30 weight percent, or in the alternative from 10 to 20 weight percent, or in the alternative, from 20 to 30 weight percent, based on the total weight of the thermoplastic composition.

The dispersed phase, component (B), comprises one or more crosslinked (meth)acrylate copolymers, wherein the one or more crosslinked (meth)acrylate copolymers comprise at least 95 percent by weight derived from methyl methacrylate units. All individual values from at least 95 weight percent are included herein and disclosed herein; for example, the weight percent of the methyl methacrylate units in the dispersed phase may be equal to or greater than 95, 96, 97, 98, or 99 weight percent based on the total weight of the dispersed phase. As used herein "(meth)acrylate" means acrylate or methacrylate. Exemplary (meth)acrylate copolymers comprise one or more monomers selected from the group consisting of butyl acrylate, ethyl acrylate, 2-ethyl hexyl acrylate, propyl acrylate, methyl acrylate, hexyl acrylate, butylmethacrylate, methylmethacrylate, ethylhexyl methacrylate, benzyl acrylate, lauryl methacrylate and stearyl methacrylate.

The dispersed phase further comprises greater than zero and less than or equal to 0.5 percent derived from one or more multifunctional cross-linking monomers and/or graft-linking agents. As used here the term "one or more multifunctional cross-linking monomers and/or graft-linking agents" means that one or more cross-linking monomers may be present, one or more graft-linking agents may be present or that one or more crosslinking monomers in combination with one or more graft-linking agent may be present. The weight percent range given is for the combination of all such crosslinking monomers and/or graft-linking agents present. The weight percent of the cross-linking monomer and/or graft-linking agents may be from a lower limit of 0.0005, 0.001, 0.005, 0.01, 0.2, 0.3, 0.4 or 0.49 weight percent to an upper limit of 0.001, 0.01, 0.1, 0.2, 0.3, 0.4 or 0.5 weight percent, based on the total weight of the dispersed phase. For example, the weight percent of the cross-linking monomer and/or graft-linking agent may be in the range of from 0.0005 to 0.5 weight percent, or in the alternative, from 0.001 to 0.4 weight percent, or in the alternative, from 0.005 to 0.2 weight percent, based on the total weight of the dispersed phase. A crosslinking monomer is a monomer that has two or more reactive groups that are capable of participating in a polymerization reaction. Exemplary crosslinkers include, but are not limited to, divinylbenzene; vinyl group-containing monomers including; allyl compounds including allyl(meth)acrylate, diallyl fumarate, diallyl phthalate, diallylacrylamide, triallyl(iso)cyanurate, and triallyl trimelitate; (poly)alkylene glycol di(meth)acrylate compounds including ethylene glycol dimethacrylate (EGDMA), diethylene glycol dimethacrylate, 1,6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri(meth)acrylate, dipentaerythritol hexa(meth)acrylate, dipentaerythritol penta(meth)acrylate, and glycerol tri(meth)acrylate and mixtures and combination thereof. The preferred crosslinker is EGDMA.

Graft-linking agents may be used with or in lieu of the crosslinking monomers. Graft-linking agents useful in some embodiments of the invention include polyethylenically unsaturated monomers copolymerizable with the monounsaturated monomers present in the second component, and having two or more non-conjugated double bonds of differing reactivity, as for example allyl methacrylate, diallyl maleate and allyl acryloxypropionate. The preferred graft-linking agent is allyl methacrylate.

The thermoplastic composition of the invention comprises components (A) and (B) as described herein wherein the difference in refractive index between components (A) and (B) is equal to or greater than 0.08. All individual values and subranges from greater than 0.08 are included herein and disclosed herein; for example, the difference in the refractive index between components (A) and (B) may be equal to or greater than 0.08, or in the alternative, equal to or greater than 0.09, or in the alternative, equal to or greater than 0.1, or in the alternative, equal to or greater than 0.12. The refractive indices are calculated based on the values published in the Polymer Handbook (Refractive Indices of Polymers, J. Seferis, Polymer Handbook, 4$^{th}$ Edition, p. VI/571).

In some embodiments, the volume average particle size of the crosslinked (meth)acrylate copolymer of the invention is equal to or less than 1.0 micron. All individual values and subranges from equal to or less than 1.0 micron are included herein and disclosed herein; for example, the volume average particle size of the crosslinked (meth)acrylate copolymer may be from a lower limit of 50, 100, or 150 nm to an upper limit of 600, 700, or 1,000 nm. For example, the volume average particle size of the crosslinked (meth) acrylate copolymer may be in the range of from 50 to 1000 nm, or in the alternative, from 100 to 700 nm, or in the alternative, from 150 to 600 nm.

In some embodiments of the invention, the crosslinked (meth)acrylate copolymer has a weight average molecular weight of less than 1 million. All individual values and subranges from less than 1 million are included herein and disclosed herein; for example, the weight average molecular weight may be from a lower limit of 5,000; 6,000; or 7,000 to an upper limit of 22,000; 50,000; 0.9 million; or 1 million. For example, the weight average molecular weight may be in the range of from 5,000 to 1 million; or in the alternative, from 200,000 to 500,000; or in the alternative from 6,000 to 50,000; or in the alternative, from 70,000 to 250,000.

In some embodiments of the invention, the crosslinked (meth)acrylate copolymer has a glass transition temperature (Tg) of equal to or greater than 100° C. (measured by DSC, second heat). All individual values and subranges from equal to or greater than 100° C. are included herein and disclosed herein; for example, the Tg (measured by DSC, second heat) of the crosslinked (meth)acrylate copolymer may be from a lower limit of 100, 110, 120, 125, or 130° C.

In some embodiments of the invention, the crosslinked (meth)acrylate copolymer is obtained by an emulsion polymerization process.

In some embodiments of the invention, the inventive thermoplastic composition has a Flop Index value equal to or greater than 4. All individual values and subranges equal to or greater than 4 are included herein and disclosed herein; for example, the Flop Index value of the thermoplastic composition may be equal to or greater than 4; in the alternative, equal to or greater than 5; in the alternative, equal to or greater than 6; in the alternative, equal to or greater than 7; in the alternative, equal to or greater than 8; in the alternative, equal to or greater than 10; in the alternative, equal to or greater than 12; in the alternative, equal to or greater than 14; or in the alternative, equal to or greater than 16. The Flop Index value may be in the range from 4 to 10; in the alternative, from 5 to 9; or in the alternative, from 6 to 8.

In some embodiments of the invention, the dispersed phase further comprises, from 0.001 to 10 weight percent of one or more chain transfer agents. All individual values and subranges from 0.001 to 10 weight percent are included herein and disclosed herein; for example, the amount of chain transfer agent in the dispersed phase may be from a lower limit of 0.001, 0.01, 0.05, 0.1, 1, 2, 3, 4, 5, 6, 7, 8 or 9 weight percent to an upper limit of 0.05, 0.1, 1, 2, 3, 4, 5, 6, 7, 8, 9 or 10 weight percent. For example, the amount of chain transfer agent in the dispersed phase may be in the range of from 0.001 to 10, or in the alternative, from 0.05 to 8.0; or in the alternative, from 0.10 to 5 weight percent.

The one or more chain transfer agents may be selected from, for example, $C_4$-$C_{18}$ alkyl mercaptans, mercapto-group-containing acids/esters such as butyl mercapto propionate, thiophenols, carbon tetrabromide, carbon tetrachloride, and trichlorobromoethane alcohols, including for example, isopropanol, isobutanol, lauryl alcohol, or t-octyl alcohol. In a preferred embodiment, from 0.01 to 10 weight percent chain transfer agent is used. Alternatively, suitable molecular weights may be obtained by increasing the initiator level, or by a combination of increased initiator level, increased temperature and a chain transfer agent.

In some embodiments, the crosslinked (meth)acrylate copolymer of the thermoplastic composition has a swell ratio from 1.5 to 15. All individual values and subranges from 1.5 to 15 are included herein and disclosed herein; for example, the swell ratio of the crosslinked (meth)acrylate copolymer of the thermoplastic composition may be from a lower limit of 1.5, 2, 4, 6, 8, 10, 12, or 14 to an upper limit of 3, 5, 7, 9, 11, 13 or 15. For example, the swell ratio may be in the range from 4 to 12; alternatively from 3 to 10; alternatively, from 5 to 9; alternatively from 6 to 10; alternatively, from 7 to 15; or alternatively, from 7 to 13.

In the process for producing the thermoplastic composition, one or more continuous phase or thermoplastic matrix comprising one or more thermoplastic polymers, as described hereinabove, and a dispersed phase or second component, as described hereinabove, are melt kneaded, for example, via a Haake mixer, a Banbury mixer, or an extruder, e.g. twin screw extruder. The second component polymer particles are physically, and preferably uniformly, dispersed in the continuous phase or thermoplastic matrix.

The thermoplastic compositions of the present invention may further includes additional additives including, but are not limited to, antistatic agents, antimicrobial agents, color enhancers, dyes, colorants, lubricants, fillers, flame retardants, heat stabilizers, pigments, primary antioxidants, secondary antioxidants, processing aids, UV stabilizers, surfactants, nucleating agents, coupling agents, compatibilizers, slip agents, plasticizers, admixtures, impact modifiers, blends thereof, and combinations thereof.

The inventive thermoplastic compositions may contain any amounts of additives. The inventive thermoplastic compositions may compromise from 0 to 20 percent by the combined weight of such additives, based on the weight of the inventive thermoplastic composition including such additives. All individual values and subranges from about 0 to about 20 weight percent are included herein and disclosed herein; for example, the inventive thermoplastic compositions may compromise from 0 to 7 weight percent by the combined weight of additives; or in the alternative, from 0 to 10 weight percent; or in the alternative, from 0 to 5 weight percent; or in the alternative, from 0 to 13 weight percent; or in the alternative, from 0 to 20 weight percent; or in the alternative, from 2 to 8 weight percent; or in the alternative, from 5 to 10 weight percent.

The thermoplastic compositions disclosed herein can be used to manufacture durable articles for the automotive, construction, medical, food and beverage, electrical, appliance, business machine, and consumer markets. In some embodiments, the thermoplastic compositions are used to manufacture durable parts or articles selected from toys, computer housings, computer and/or electronic devices such as handheld personal devices, portable music players, laptop computers and the like, household appliances, powertool housing, automotive bumpers, refillable water bottles, office supplies and kitchen wares. Additionally the thermoplastic compositions of the present invention may also be formed into consumer and sporting-goods.

The thermoplastic compositions can be used to prepare these durable parts or articles with known polymer processes such as extrusion (e.g., sheet extrusion and profile extrusion); molding (e.g., injection molding, rotational molding, and blow molding); and blown film and cast film processes. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be a film die, blown film die, sheet die, pipe die, tubing die or profile extrusion die.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum.

Molding is generally a process by which a polymer is melted and led into a mold, which is the inverse of the desired shape, to form parts of the desired shape and size. Molding can be pressureless or pressure-assisted.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming.

Blow molding can be used for making hollow plastics containers. The process includes placing a softened polymer in the center of a mold, inflating the polymer against the mold walls with a blow pin, and solidifying the product by cooling. There are three general types of blow molding: extrusion blow molding, injection blow molding, and stretch blow molding. Injection blow molding can be used to process polymers that cannot be extruded. Stretch blow molding can be used for difficult to blow crystalline and crystallizable polymers such as polypropylene.

In some embodiments of the invention, the thermoplastic composition is processed at a temperature of equal to or greater 170° C. All individual values and subranges of equal to or greater than 170° C. are included herein and disclosed herein; for example, the inventive thermoplastic compositions may processed at a temperature equal to or greater than 170° C.; or in the alternative, equal to or greater than 200° C.; or in the alternative, equal to or greater than 250° C.; or in the alternative, equal to or greater than 275° C.; or in the alternative, equal to or greater than 300° C. For example, the thermoplastic composition may be processed at a temperature from 170 to 300° C.; or in the alternative, from 225 to 350° C.; or in the alternative, from 225 to 275° C.

In some embodiments of the invention, the thermoplastic composition is processed at a shear rate of equal to or greater than $100$ $s^{-1}$. All individual values and subranges of equal to or greater than $100$ $s^{-1}$ are included herein and disclosed herein; for example, the inventive thermoplastic compositions may processed at a shear rate of equal to or greater than $100$ $s^{-1}$; or in the alternative, equal to or greater than $110$ $s^{-1}$; or in the alternative, equal to or greater than $120$ $s^{-1}$; or in the alternative, equal to or greater than $130$ $s^{-1}$; or in the alternative, equal to or greater than $140$ $s^{-1}$. In some embodiments, the thermoplastic composition is processed at a shear rate having an upper limit of $2000$ $s^{-1}$, or in the alternative, at an upper limit of $1750$ $s^{-1}$, or in the alternative, at an upper limit of $1250$ $s^{-1}$, or in the alternative, at an upper limit of $1000$ $s^{-1}$, or in the alternative, at an upper limit of $500$ $s^{-1}$, or in the alternative, at an upper limit of $300$ $s^{-1}$, or in the alternative, at an upper limit of $200$ $s^{-1}$. Any combination or subcomination of the process conditions discussed herein may be used in alternative embodiments of the invention.

EXAMPLES

The following examples illustrate the present invention but are not intended to limit the scope of the invention. The examples of the instant invention demonstrate that the inventive composition exhibits nacrescence even following exposure to increased temperatures and shear forces.

The following emulsion polymerization process was used to prepare Component (B) used in preparation of the thermoplastic composition inventive examples: Inventive Example 1

600 grams deionized water, 0.15 grams NaEDTA (sodium salt of ethylene diamine tetra-acetate) and 0.03 grams of iron sulfate heptahydrate were charged to a round bottom 5 liter glass reactor. The mixture in the glass reactor was stirred at 100 rpm and heated to 40° C. with nitrogen sparging for 30 minutes, followed by the addition of 0.6 gms of sodium dithionite in 50 grams water. The mixture in the glass reactor was maintained at 40(±2) ° C. A monomer emulsion prepared by mixing: (1) 1500 grams methyl methacrylate, 1.5 grams of butyl mercaptopriopionate, 0.018 grams of ethylene glycol dimethacrylate (EGDMA), and 135 grams of sodium dodecylbenzene sulfonate (10% solution) in 720 grams of water, was then fed into the glass reactor over a period of 6 hours. In the case of inventive examples, variable amounts of butyl mercaptopropionate were added to this monomer emulsion mixture. At the same time, (2) a solution of 3.6 grams of sodium persulfate in 190 grams water; and (3) a solution of 1.2 grams of sodium formaldehyde sulfoxylate in 190 grams of water was fed into the glass reactor over a period of 7 hours. That is, the feeds of components (2) and (3) continued for 1 hour following the termination of the feed of the monomer emulsion. During the feed of components (1), (2) and (3) the temperature of the mixture in the glass reactor was maintained at 40±2° C. After all of the components (1)-(3) were fed into the glass reactor, the temperature of the mixture in the glass reactor, a latex, was raised to 60° C. and 7.5 grams of Irganox 1076 powder was added. The latex was held at that temperature for 30 minutes before cooling to 40° C. The pH of the latex was then adjusted to from 6.8 to 7.0 by first adding 0.2 wt % (based on total polymer) monosodium phosphate solution (10% soln.) and then 0.6 wt % (based on total polymer) disodium phosphate solution (10% soln.) drop-wise until the pH was brought into the desired range. The latex was then filtered and isolated by freeze drying to a moisture content of <0.5 percent by weight. The volume average particle size was measured via dynamic light scattering and found to be 152 nm.

Component (B), used in Inventive Example 1 having a composition of 99.9988 weight percent MMA and 0.0012 weight percent EGDMA, and 0.01 weight percent butyl mercapto propionate (BMP) was prepared via the emulsion polymerization process described above. Inventive Example 2.

Component (B), used in Inventive Example 2 was prepared via the emulsion polymerization process of Inventive Example 1, and had a composition of 99.9988 weight percent of MMA and 0.0012 weight percent of EGDMA, and 1.0 weight percent of butyl mercapto propionate (BMP), and was isolated by freeze drying to a moisture content of <0.5 percent by weight.

Comparative Example 1

Component (B) used in Comparative Example 1 was prepared via the emulsion polymerization process of Inventive Example 1, had a composition of 99.9988 weight percent of MMA, 0.0012 weight percent of EGDMA and 0.0 weight percent of butyl mercapto propionate (BMP) and was isolated by freeze drying to a moisture content of <0.5 percent by weight.

Comparative Example 2

Component (B) used in Comparative Example 2 was prepared via the emulsion polymerization process of Inventive Example 1, had a composition of 96.2 weight percent MMA, 3.8 weight percent of EGDMA and 0.0 weight percent of butyl mercapto propionate, and isolated by freeze drying to a moisture content of <0.5 percent by weight.

The volume average particle size, molecular weights, glass transition temperature and calculated refractive indices for all examples are listed in Table 1.

Each of the Inventive and Comparative Examples were prepared by melt blending the PMMA-based component with Lexan 143 (a Bisphenol A-based polycarbonate resin made by SABIC Innovative Plastics) in a twin screw extruder at 280° C. The resulting strands were pelletized and injection molded into 3 mm thick plaques. The mold temperature was 100° C., and two molded plaques were prepared for each composition, one with a barrel temperature 230° C. and a second with a barrel temperature of 290° C.

Figure 1B:
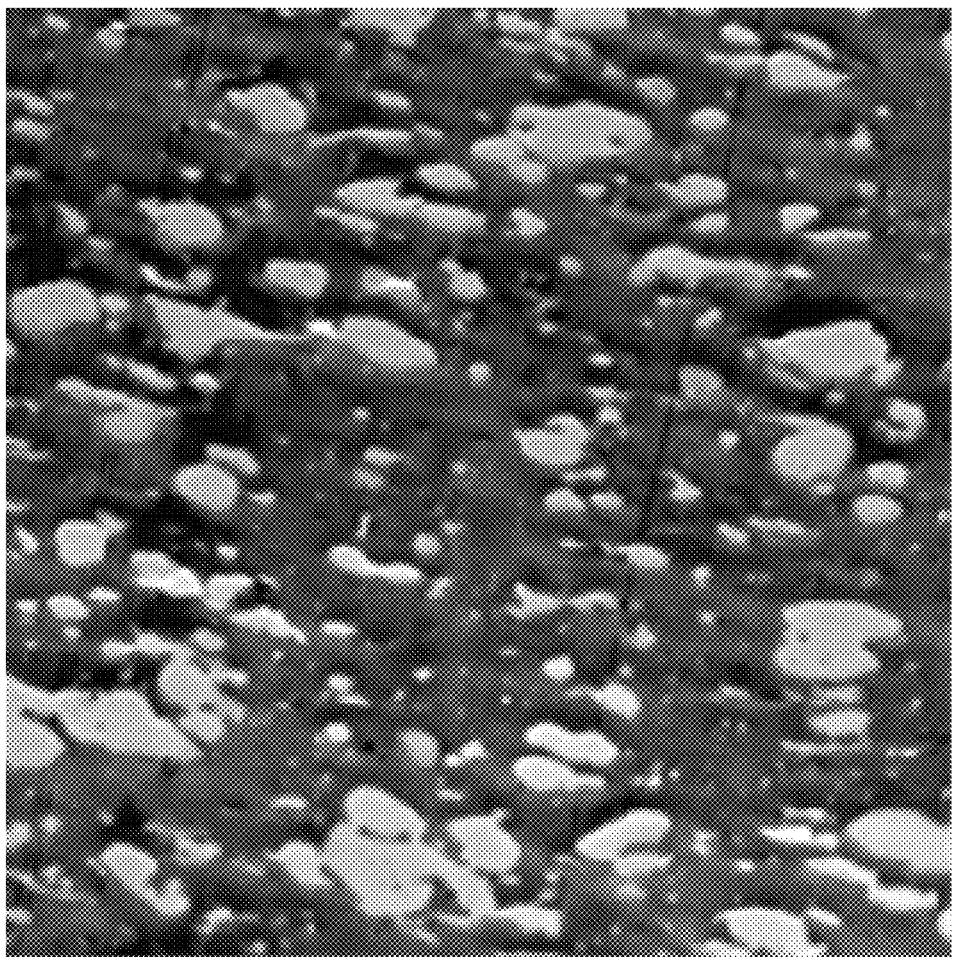

FIGS. 1A and 1B compare the transmission electron micrographs ("TEM") of the 3 mm injection molded plaques produced from the thermoplastic compositions of Inventive Example 1 and Comparative Example 1. For TEM, ultrathin sections (40-60 nm) were prepared using a 45° diamond knife at room temperature on a Reichert Ultracut S ultramicrotome. The grids were stained with ruthenium tetraoxide vapors for 40 minutes to bring out contrast between the PC and PMMA in the composition. The sections were imaged at 100 kV on a Hitachi H-7000 TEM equipped with a CCD camera for imaging, using the Gatan Digital Imaging software. Images were taken 2000, 3000 and 5000×.

The lightly cross-linked polymethylmethacrylate particles of Inventive Example 1 shown in FIG. 1A have a platelet-like orientation in the direction of the flow. The composition of Comparative Example 1 is very similar to that of Inventive Example 1 but contains no chain transfer agent and is of a higher molecular weight. As can be seen in FIG. 1B, an electron micrograph of the high molecular weight particles of Comparative Example 1 does not exhibit deformation of the particles in the direction of flow.

Table 1 provides the Flop Index values and description of the visual appearance of the plaques formed from each of Inventive Examples 1-2 and Comparative Examples 1-2. In Table 1, the Flop Index was measured on a plaque prepared by injection molding a blend of 30% by weight of the Inventive/Comparative Example plus additives and 70% by weight of polycarbonate (Lexan 143) at 290° C. The red pigment referred to in Table 1 was PV Fast Red HB™ 1, Pigment Red 247™, available from Clariant which is a napthol mono azo compound, CAS 43035-18-3. The blue pigment used was PV Fast Blue BG™, Pigment Blue 15™, available from Clariant which is a copper phthalocyanine, CAS 147-14-8. Pigment was added through a masterbatch. 1% by weight of masterbatch was added to Lexan 143. Final level of pigment is 0.01% in the final composition based on the total weight of the composition. "Calculated RI" in Table 1 refers to a calculated refractive index which was calculated as described below.

In each instance of Inventive Examples 1 and 2 the plaques formed at 290° C. had a higher level of nacrescence than those formed at 230° C., as determined by visual inspection.

TABLE 1

| Example | Composition | Appearance of molded plaque | Flop Index | Weight Average Molecular Weight | Tg, ° C. | Calculated RI | Volume Average Particle Size (nm) |
| --- | --- | --- | --- | --- | --- | --- | --- |
| Inventive Example 1 | 99.9988 weight percent MMA crosslinked with 0.0012 weight percent EGDMA and 0.1 weight percent BMP | Nacreous opaque | 4.54 5.89 (with red pigment) | 200,000 g/mole | 126 | 1.489 | 152 |
| Comparative Example 1 | 99.9988 weight percent MMA crosslinked with 0.0012 weight percent EGDMA; no BMP | Glossy; opaque | 0 | 1,200,000 g/mole | 128 | 1.489 | 151 |
| Inventive Example 2 | MMA cross-linked with 0.0012 weight percent EGDMA and 1 wt % BMP | Nacreous opaque | 8.67 (with blue pigment) | 30,000 g/mole | 130 | 1.489 | 161 |
| Comparative Example 2 | 96.2 weight percent MMA crosslinked with 3.8 weight percent EGDMA; no BMP | Glossy, opaque | 0 | 55,000 g/mole | 133 | 1.491 | 158 |

Test Methods

Flop Index Values

Flop Index values were measured by forming the Inventive and Comparative thermoplastic compositions into 3 mm plaques by blending with Lexan 143 and injection molding at a temperature of 290° C. (mold temperature 100° C.). Flop Index measurements were then conducted at room temperature and pressure as described below.

Flop Index was characterized using a MA68II portable angle spectrophotometer (X-Rite Instruments, Grand Rapids Mich.). For each sample FLOP was characterized in the machine direction and cross direction, at least at three different locations on the sample. The values reported here are average Flop Index values, which is similar to what the human eye would perceive. 45-degree incident light is collected at 20, 45, and 70 degrees from the specular reflection angle. The spectrophotometric output, e.g., CIE L* (L1*, L2*, L3* respectively) is used to calculate the Flop Index value according to the equation:

$$\text{Flop Index} = (2.69(L_{15} - L_{110})^{1.11}) \div (L_{45})^{0.86},$$

where CIE refers to the International Commission on Illumination (usually abbreviated CIE for its French name, Commission internationale de l'éclairage).

Particle Size

The volume average particle size was measured on very dilute latexes (diluted to 0.001% solids) with BI 90 (Brookhaven Instruments, Holtsville, N.Y.) particle size detector, utilizing Dynamic Light Scattering (15° and 90° scattering angles) and a laser light source. The signal is detected by a photodiode array and the data analyzed with a built in correlator. The volume average particle sizes of the resulting latexes were measured to be in the range of 125-300 nm.

GPC

The term "molecular weight" as used refers to peak average molecular weight as determined by gel permeation chromatography against narrow molecular weight polystyrene standards in tetrahydrofuran solvent at 25° C. using Polymer Laboratories data manipulation software.

Refractive Index

The refractive indices were calculated based on the values published in the Polymer Handbook (Refractive Indices of Polymers, J. Seferis, Polymer Handbook, 4$^{th}$ Edition, p. VI/571).

DSC

The glass transition is measured in a TA Instruments Q1000 Differential Scanning calorimeter using a small sample of the polymer (5-20 mg) sealed in a small aluminum pan. The pan is placed in the DSC apparatus, and its heat flow response is recorded by scanning at a rate of 10° C./min from room temperature up to 180° C. The glass transition temperature is observed as a distinct shift in the heat flow curve.

Swell Ratio

The swell ratio is related to the level of crosslinking of a polymer, with the swell decreasing with increasing crosslinking To measure the swell ratio of a crosslinked polymer, a sample of the crosslinked polymer is immersed in a solvent (in which the uncrosslinked polymer is soluble), such as methyl ethyl ketone. A portion of the crosslinked polymer is soluble. The remainder of the crosslinked polymer is insoluble and becomes swollen with the solvent. The weight of the insoluble portion is recorded. Subsequently, the insoluble portion is dried. The ratio of the weight of swollen insoluble portion of the crosslinked polymer to the weight of the dried insoluble portion is defined as the swell ratio.

The present invention may be embodied in other forms without departing from the spirit and the essential attributes thereof, and, accordingly, reference should be made to the appended claims, rather than to the foregoing specification, as indicating the scope of the invention.

We claim:

1. A thermoplastic composition comprising:
   (A) from 55 to 95 percent by weight of a thermoplastic matrix comprising one or more thermoplastic polymers; and
   (B) from 5 to 45 percent by weight of a dispersed phase which comprises a crosslinked (meth)acrylate copolymer, wherein the (meth)acrylate copolymer comprises at least 95 percent by weight derived from methyl methacrylate units and from greater than zero to less than 0.5 percent by weight derived from ethylene glycol dimethacrylate (EGDA) and from 0.1 to 1 percent by weight of butyl mercapto propionate (BMP) as a chain-transfer agent;
   wherein the difference in refractive index between components (A) and (B) is greater than 0.08 and wherein the thermoplastic composition has a Flop Index value in the range of from 4 to 10.

2. A method for producing a thermoplastic composition comprising the steps of:
   selecting a thermoplastic matrix comprising one or more thermoplastic polymers;

selecting a dispersed phase which comprises a crosslinked (meth)acrylate copolymer, wherein the (meth)acrylate copolymer comprises at least 95 percent by weight derived from methyl methacrylate units and from greater than zero to less than 0.5 percent by weight derived from ethylene glycol dimethacrylate (EGDA) and from 0.1 to 1 percent by weight of butyl mercapto propionate (BMP) as a chain-transfer agent, wherein the difference in refractive index between the thermoplastic matrix and the dispersed phase is greater than 0.008;

melt kneading the dispersed phase into the thermoplastic matrix;

thereby producing the thermoplastic composition, wherein the thermoplastic composition comprises from 55 to 95 percent by weight of the thermoplastic matrix, and from 45 to 5 percent by weight of the dispersed phase, based on the total weight of the thermoplastic composition, wherein the thermoplastic composition has a Flop Index value in the range of from 4 to 10.

3. An article comprising:

a thermoplastic composition comprising the melt blending product of:
- (A) from 55 to 95 percent by weight of a thermoplastic matrix comprising one or more thermoplastic polymers selected from the group consisting of polycarbonate and polyesters; and
- (B) from 5 to 45 percent by weight of a dispersed phase which comprises a crosslinked (meth)acrylate copolymer, wherein the (meth)acrylate copolymer comprises at least 95 percent by weight derived from methyl methacrylate units and from greater than zero to less than 0.5 percent by weight derived from ethylene glycol dimethacrylate (EGDA) and from 0.1 to 1 percent by weight of butyl mercapto propionate (BMP) as a chain-transfer agent;

wherein the difference in refractive index between components (A) and (B) is greater than 0.08 and wherein the thermoplastic composition has a Flop Index value in the range of from 4 to 10.

4. A method for forming an article comprising the steps of:

selecting a thermoplastic composition comprising the melt blending product of:
- (A) from 55 to 95 percent by weight of a thermoplastic matrix comprising one or more thermoplastic polymers selected from the group consisting of polycarbonate and polyesters; and
- (B) from 5 to 45 percent by weight of a dispersed phase which comprises a crosslinked (meth)acrylate copolymer, wherein the (meth)acrylate copolymer comprises at least 95 percent by weight derived from methyl methacrylate units and from greater than zero to less than 0.5 percent by weight derived from ethylene glycol dimethacrylate (EGDA) and from 0.1 to 1 percent by weight of butyl mercapto propionate (BMP) as a chain-transfer agent, wherein the difference in refractive index between components (A) and (B) is greater than 0.08 and wherein the thermoplastic composition has a Flop Index value in the range of from 4 to 10;

forming said thermoplastic composition into said article.

5. The thermoplastic composition according to claim 1, wherein the crosslinked (meth)acrylate copolymer has a volume average particle size of equal to or less than 1.0 micron.

6. The thermoplastic composition according to claim 1, wherein the crosslinked (meth)acrylate copolymer has a weight average molecular weight of equal to or less than 1 million.

7. The thermoplastic composition according to claim 1, wherein the crosslinked (meth)acrylate copolymer has a Tg of equal to or greater than 100° C. (measured by DSC, second heat).

8. The thermoplastic composition according to claim 1, wherein the crosslinked (meth)acrylate copolymer is obtained by an emulsion polymerization process.

9. The method according to claim 4 wherein the step of forming the thermoplastic composition into an article comprises injection molding the thermoplastic composition into an article at a temperature equal to or greater than 200° C. and at a shear rate equal to or greater than 100 $s^{-1}$.

* * * * *